March 13, 1934.  G. F. DALY  1,950,485
CLUTCH MECHANISM
Filed June 18, 1930  3 Sheets-Sheet 3
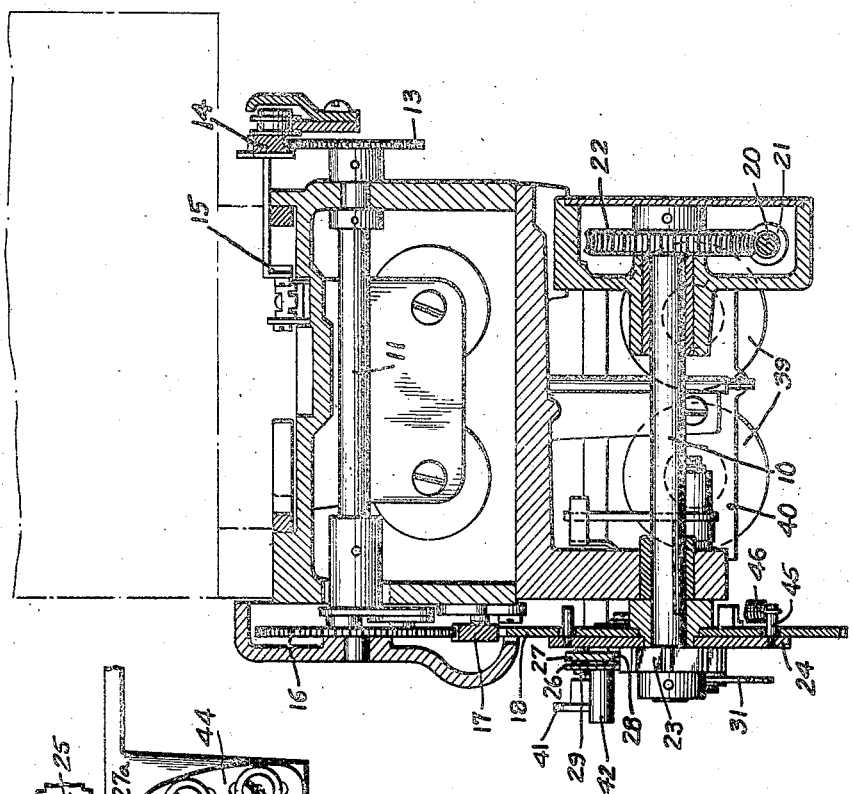
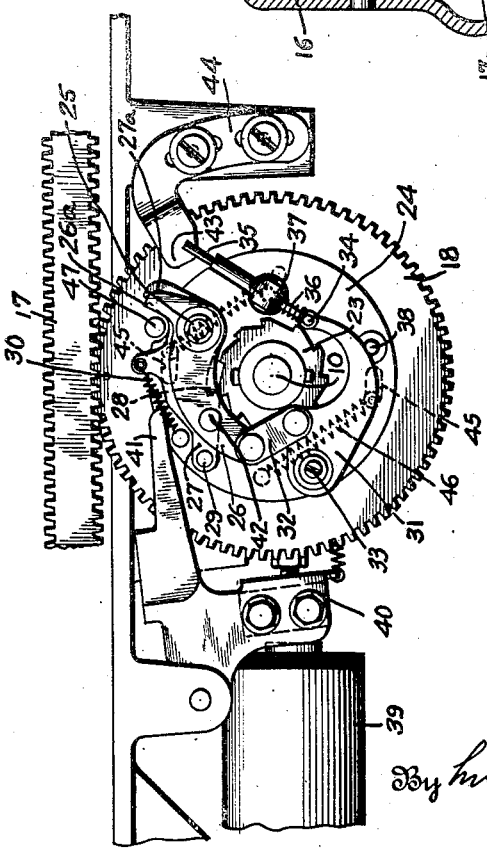
Inventor
George F. Daly
By his Attorney
W. M. Wilson Patented Mar. 13, 1934

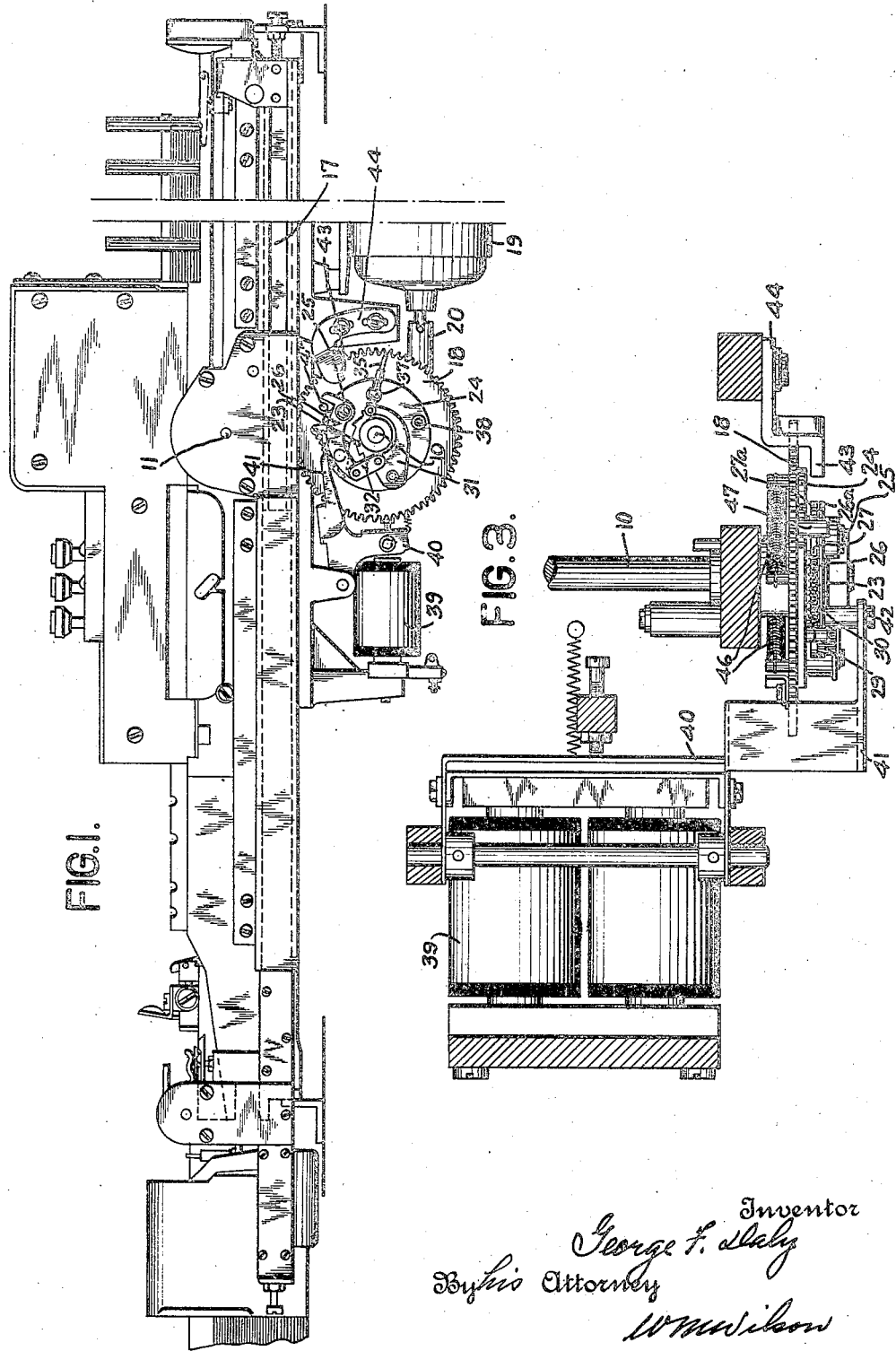

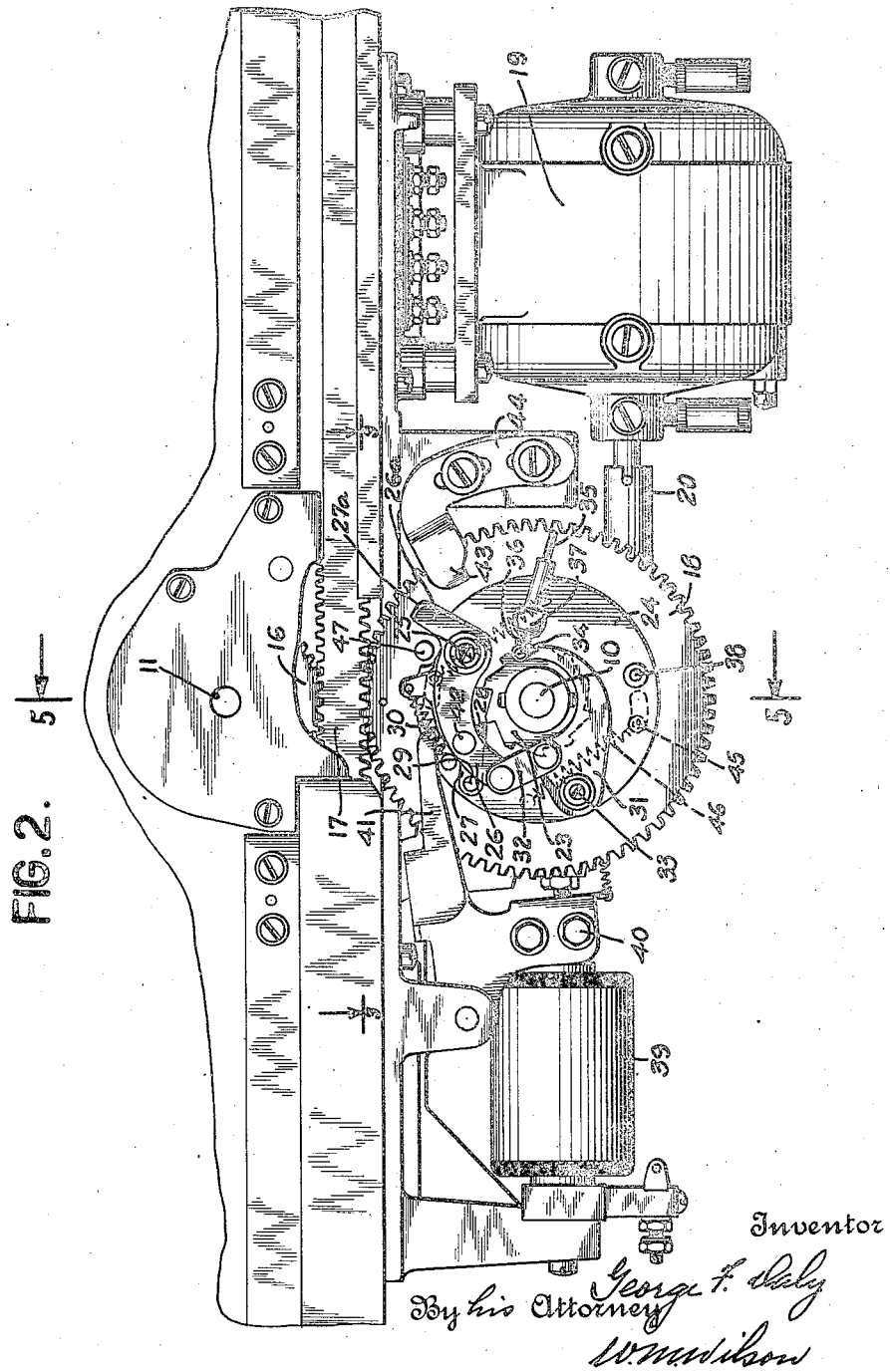

1,950,485

UNITED STATES PATENT OFFICE 1,950,485

CLUTCH MECHANISM

George F. Daly, Johnson City, N. Y., assignor, by mesne assignments, to International Business Machines Corporation, New York, N. Y., a corporation of New York Application June 18, 1930, Serial No. 461,993

10 Claims. (Cl. 192—40)

The invention relates to a clutch mechanism and more particularly to a clutch mechanism in a punching machine having a motor drive, for automatically returning the carriages holding the master card and punched card, and the invention has been shown as applied to a type of punching machine shown in the co-pending application of Lee and Daly, Serial No. 391,874, for Improvements in duplicating machines.

In the operation of such machines it is frequently necessary that certain parts be connected to the driving mechanism for operation under control of variably operated controlling devices. For example, a certain shaft may have to be clutched to another driving shaft to cause it to operate connected mechanisms. The driving shaft may be adapted to be engaged only during certain portions of its cycle of operation while the engaging mechanism may be adapted to cause engagement during other portions of its cycle. With such a structure it may happen that when the tripping mechanism is momentarily actuated the driving member may not be in position to be engaged and consequently no connection will be made at the moment of tripping.

One object of the invention therefore is to provide a clutch mechanism wherein a momentary tripping operation may be extended so as to coincide with the engaging period of the driving member.

According to the preferred form of the invention a continually running actuator having ratchet teeth circumferentially spaced is adapted to engage a pivoted clutch pawl mounted upon the driven member. A toggle mechanism associated with the pawl is adapted when the pawl is rocked into engagement with the driver to resiliently hold it in such position to insure positive engagement. Upon disengagement of the parts the toggle mechanism is adapted to hold the pawl out of engagement until again tripped.

A further object of the invention is to provide automatic releasing mechanism so that in the event the movement of the driven member is impeded the driving connection will be released.

Further and other objects and advantages will be hereinafter set forth in the accompanying specification and claims, and shown in the drawings, which by way of illustration show what is now considered to be the preferred embodiment of the invention.

In the accompanying drawings I have shown for the purpose of illustration one form of structure embodying the invention in which Fig. 1 is an assembly view of a punching machine showing the application of the clutch mechanism.

Fig. 2 is an enlarged detail view of the mechanism in normal position.

Fig. 3 is a plan section of the device taken on line 3—3 of Fig. 2.

Fig. 4 is a position view of parts shown in Fig. 2.

Fig. 5 is a section in elevation taken on the line 5—5 of Fig. 2.

The clutch has been illustrated by way of example as a connecting or clutching mechanism between a driving shaft 10 and a driven shaft 11. The driving shaft 10 rotates constantly while the driven shaft 11 is normally stationary but may be clutched to rotate with the driving shaft by means of the clutch to be hereinafter described and when so clutched will rotate in one direction and when released it may return to its original position under control of the punching mechanism.

The driven shaft 11 has a gear 13 secured to one end (see Fig. 5) meshing with the escapement rack 14 of a card carriage 15. The shaft 11 may thus be controlled by the usual escapement mechanism (not shown) to turn in a counter-clockwise direction as viewed in Fig. 2 step-by-step or in greater increments according to the operation of the punching mechanism. Shaft 11 carries at its other end a gear 16 meshing with a rack 17 which in turn meshes with a gear 18 freely mounted on shaft 10.

Secured to the underside of the base of the machine is a motor 19 having a coupling connection to a stub shaft 20 to which is secured a worm 21 (Fig. 5) in mesh with a worm wheel 22 secured to shaft 10. At its opposite end, shaft 10 has secured thereto a ratchet shaped clutch element 23 (see Fig. 2). Loosely mounted on shaft 10 between clutch element 23 and gear 18 is a disc 24 attached to gear 18 in a manner to be described.

Pivoted at 25 to disc 24 is a pair of arms 26 and 27. Arm 27 has a clutch tooth 28 and in its free end it carries a pin 29 extending above and normally resting on the upper edge of arm 26. A spring 30 biases the arm 27 in a counterclockwise direction.

The free end of arm 26 is connected to a toggle plate 31 by a link 32, the end of toggle plate 31 distant from its pivot 33 being articulated at 34 to a rod 35. The rod 35 is urged by a spring 36 and fits in an aperture in a pin 37, rotatably mounted on the disc 24. By virtue of this construction rod 35 and plate 31 act as a toggle, spring 36 acting to impositively hold the parts either in the position of Fig. 2 with arm 26 against pin 29 or in the position of Fig. 4 with plate 31 against a pin 38 in disc 24.

For the purpose of effecting the clutching action a magnet 39 is provided and when energized attracts an armature 40 so that an arm 41 rocked clockwise thereby and consequently engaging a pin 42 of arm 26 will rock the arm 26 to the position of Fig. 4 wherein the toggle connection has been moved centrifugally, spring 36 acting to hold the parts in this position. That is, the downward movement of pin 42 under the influence of the clockwise rotation of arm 41 will have rocked arm 26 in a counterclockwise direction about its pivot 25 so that link 32, connected to the free end of arm 26, will have rocked toggle plate 31 in a clockwise direction about its pivot 33, causing the connecting point 34 of the toggle to move away from the center of the shaft 10 and in doing so rocking the rod 36 about its pivot 37 from the position of Fig. 2 to that of Fig. 4. Movement of arm 26 away from pin 29 will permit arm 27 to follow under the influence of its spring 30 and tooth 28 will move into engagement with clutch element 23. Regardless of the relative position of the constantly running clutch element 23, the arm 26 will be rocked to its alternate position upon the momentary energization of magnet 39 and if it so happens that at such times the high point of a ratchet tooth is beneath tooth 28 of arm 27, the spring 30 will continue to urge the tooth 28 into engagement with the ratchet and positive engagement will therefore be made with the driving edge of the next succeeding ratchet tooth.

Gear 18 will thereupon be driven in a counterclockwise direction substantially a single revolution, shifting rack 17 to the left and rotating gear 16 to effect movement of the card carriage of the punching machine.

At the termination of the counterclockwise movement of gear 18, the tails 26a and 27a of arms 26 and 27 will strike a projection 43 of an adjustable plate 44 to effect the disengagement of tooth 28 and ratchet 23 by a reverse action and the return of the toggle to its initial position. The gear 18 and connected parts will be stepped in a clockwise direction during operation of the punching machine until the parts again occupy the position shown in Figs. 1 and 2. The manner in which gear 16 and rack 17 are returned to initial position is fully shown and described in the patent to F. L. Lee and B. H. Phillips, 1,772,186, issued August 5, 1930, in which reference may be had to Fig. 5 wherein gear 38 and rack 32 correspond to gears 16 and 17 respectively.

Disc 24 is preferably mounted on gear 18 by pin and slot connections 45 (Figs. 2, 4 and 5) and these elements are connected to each other for driving movement by springs 46. This construction is provided to take up the shocks due to starting from a position of rest and to permit the clutch elements to be disengaged in the event that the operation of the driven mechanism is impeded.

For this purpose the gear 18 is provided with a pin 47 extending in front of tails 26a and 27a, so that if the parts are in engagement for driving and the driven mechanism is restrained against operation so as to hold gear 18 stationary, the continued rotation of disc 24 will stretch springs 46 and cause tails 26a and 27a to strike pin 47 whereupon tooth 28 will be disengaged from ratchet 23 and the toggle will be moved to its inoperative position.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore by the scope of the following claims:

1. A clutch mechanism comprising a driving element and a driven element, said driven element having a movable clutching member and a toggle joint for controlling said clutching member, means for moving said toggle joint across dead center to permit engagement of the clutch elements and means for returning said clutching member to its initial position independently of said toggle joint.

2. A clutch mechanism comprising a driving element and a driven element, said driven element having a clutching pawl and a toggle joint mounted thereon, said toggle joint being adapted to hold said pawl out of engagement with the driving clutch element and means for shifting said toggle joint to permit said pawl to engage said driving clutch element and further means for restoring said pawl independently of said toggle joint.

3. A clutch mechanism comprising a driving element and a driven element with clutching mechanism therebetween, said clutching mechanism including a toggle joint adapted to be moved across dead center during the operation of said driving element to permit engagement between said elements, and means for operating said clutching mechanism independently of said toggle joint to disengage said elements.

4. A clutch comprising a driving element and a driven element, a clutching pawl pivoted on the driven element with means for continuously and yieldably urging it toward the driving element, said driving element being provided with a notch to be engaged by said pawl for clutching operation, a toggle joint coacting with said pawl to hold it out of clutching engagement with the driving member and means for moving said toggle joint across dead center to release said pawl for engagement with said driving element.

5. A clutch mechanism comprising a driving element and a driven element, a clutching pawl, toggle mechanism carried by said driven element for holding said clutching pawl out of operative engagement with said driving element in any position, and means for moving said toggle mechanism out of cooperation with said clutching pawl for the purpose of permitting said pawl to engage said driving element, means for moving said pawl into engagement with said driving element and means independent of said toggle mechanism for holding said pawl in engagement with said driving element.

6. A clutch mechanism comprising a driving element and a driven element, and clutching mechanism therebetween, said driven element having a toggle mechanism for engaging said clutching mechanism, devices connected to said driven mechanism by a spring for operation concurrent with the operation of said driven element and means controlled by said devices for causing the disengagement of said clutching mechanism upon the extension of said spring.

7. A clutch mechanism comprising a driving element and a driven element, one of said elements having a movable clutching member and a toggle joint for controlling said clutching member, magnetically controlled means for moving said toggle joint across dead center to effect positive engagement of the clutch elements, and means operative after a predetermination period of engagement for returning said clutching member to its initial position independently of said toggle joint to cause disengagement of the clutch elements.

8. A clutch mechanism comprising a driving element and a driven element and clutching mechanism therebetween, said driven element having a toggle mechanism for engaging said clutching mechanism, devices yieldingly connected to said driven element for operation concurrently therewith and means carried by said devices for coacting with and causing the disengagement of said clutching mechanism upon relative movement between said devices and said driven element.

9. A clutch mechanism comprising a constantly running driving element and a driven element, a clutching dog and a toggle mechanism carried by said driven element, said toggle mechanism being adapted to normally hold said dog out of engagement with said driving element, and means for moving said toggle mechanism across dead center to release said dog for engagement with said driving element and means independent of said toggle mechanism for moving said dog into engagement with said driving element.

10. A clutch mechanism comprising a driving element and a driven element, said driven element having a clutching dog and a toggle joint mounted thereon the toggle joint being normally adapted to hold said dog out of engagement with the driving element, means for shifting said toggle joint to effect engagement of said dog and driving element and means for causing disengagement of said dog and driving element after a predetermined movement of the driven element.

GEORGE F. DALY.